US011315158B1

(12) United States Patent
Lidster et al.

(10) Patent No.: US 11,315,158 B1
(45) Date of Patent: Apr. 26, 2022

(54) ONLINE SALES ASSISTANCE SYSTEMS AND RELATED METHODS

(71) Applicant: Expert Minute LLC, Lewes, DE (US)

(72) Inventors: Max Lidster, Cave Creek, AZ (US); John Bolthouse, Scottsdale, AZ (US); Billie Fox, Phoenix, AZ (US)

(73) Assignee: Expert Minute LLC, Cave Creek, AZ (US)

( * ) Notice: Subject to any disclaimer, the term of this patent is extended or adjusted under 35 U.S.C. 154(b) by 632 days.

(21) Appl. No.: 15/945,317

(22) Filed: Apr. 4, 2018

(51) Int. Cl.
 *G06Q 30/06* (2012.01)
 *H04L 65/1069* (2022.01)
 *G06Q 30/02* (2012.01)
 *G06K 7/14* (2006.01)

(52) U.S. Cl.
 CPC ..... *G06Q 30/0617* (2013.01); *G06Q 30/0203* (2013.01); *G06Q 30/0609* (2013.01); *G06Q 30/0633* (2013.01); *H04L 65/1069* (2013.01); *G06K 7/1413* (2013.01); *G06K 7/1417* (2013.01); *G06Q 30/0643* (2013.01)

(58) Field of Classification Search
 CPC ..................................................... G06Q 30/06
 See application file for complete search history.

(56) References Cited

U.S. PATENT DOCUMENTS

| | | | |
|---|---|---|---|
| 7,328,176 B2 | 2/2008 | Tarvyas et al. | |
| 7,353,188 B2 | 4/2008 | Yim et al. | |
| 8,165,919 B2 | 4/2012 | Moon et al. | |
| 9,736,095 B2 | 8/2017 | Su | |
| 2001/0044751 A1* | 11/2001 | Pugliese, III | G06Q 30/0643 705/14.1 |
| 2008/0238009 A1* | 10/2008 | Carpenter | B62B 3/1408 280/33.992 |
| 2011/0106662 A1 | 5/2011 | Srinchcomb | |
| 2014/0214596 A1* | 7/2014 | Acker, Jr. | G06Q 20/20 705/26.8 |
| 2015/0112826 A1* | 4/2015 | Crutchfield, Jr. | G06Q 30/0601 705/26.1 |

(Continued)

OTHER PUBLICATIONS

One Touch Video Chat, Retail Video Chat Solutions for Today's Digital Consumer, https://otvideochat.com/industries/retail/#, Jan. 8, 2018.

(Continued)

*Primary Examiner* — Kurtis Gills
(74) *Attorney, Agent, or Firm* — Adam R. Stephenson, Ltd

(57) ABSTRACT

Implementations of a method of adding an item to an online shopping cart may include providing a sales communication interface on a portable computing device associated with a sales representative. During a video, audio, or video and audio connection, the method may include receiving an item scan request, receiving a scanned item code at a web server, forwarding the scanned item code to a database server, retrieving a retailer item identity associated with the scanned item code, and forwarding the retailer item identity to the web server, the portable computing device, and a computing device associated with an online shopper. The method may include receiving a request to add an item associated with the retailer item identity to a shopping cart associated with a website controlled by a retailer that owns the item. Adding the item to the shopping cart may be done without intervention by the online shopper.

10 Claims, 6 Drawing Sheets

(56) References Cited

U.S. PATENT DOCUMENTS

| | | |
|---|---|---|
| 2015/0142591 A1 | 5/2015 | High et al. |
| 2015/0324878 A1 | 11/2015 | Shorter |
| 2016/0117758 A1 | 4/2016 | Bleakley et al. |
| 2016/0180423 A1 | 6/2016 | Defoy |
| 2016/0189263 A1 | 6/2016 | Junge |
| 2016/0294885 A1 | 10/2016 | Fiero |
| 2016/0307151 A1* | 10/2016 | Grabovski ........... G06Q 20/202 |
| 2017/0091854 A1 | 3/2017 | Wang et al. |
| 2017/0154297 A1 | 6/2017 | Chenu et al. |
| 2017/0300980 A1 | 10/2017 | Soldate et al. |
| 2019/0130471 A1* | 5/2019 | DePizzol ........... G06Q 30/0633 |

OTHER PUBLICATIONS

Engel, VideoEngager Expands Live Video Chat Service, http://www.furnituretoday.com/article/533285-vidoengager-expands-live-chat-service/, Jul. 14, 2016.

McDonald, Why Video Chat is the Next Big Sales Platform, https://blog.salemove.com/why-video-chat-is-the-next-big-sales-platform/, Sep. 20, 2016.

Eadicicco, Apple Store Employees Will Model Different Apple Watch Styles for Online Shoppers, http://www.businessinsider.com/apple-watch-buy-online-2015-3, Mar. 5, 2015.

OCT8NE, Create an In-Store Shopping experience with Oct8ne's Exclusive Technology, https://www.oct8ne.com/features/the-coviewer/, Jan. 8, 2018.

Dhalla, 6 Ways to Use Live Video Chat on you Ecommerce Siate, http://videocommerce.com/blog/6-ways-to-use-live-video-chat-on-your-e-commerce-site/, Jan. 1, 2018.

Tagove, How Does Combining Video Chat with Co-Browsing Increase Sales?, https://www.tagove.com/combining-Video-chat-co-browsing-increase-sales/, Apr. 18, 2017.

* cited by examiner

ONLINE SALES ASSISTANCE SYSTEMS AND RELATED METHODS

BACKGROUND

1. Technical Field

Aspects of this document relate generally to sales systems, such as those used to market goods over the internet.

2. Background

Sales involves connecting a potential customer with a good or service and inviting the customer to make a decision whether to purchase. Sales activities can take place in brick and mortar establishments where customers visit physical locations to purchase the goods or receive the services.

SUMMARY

Implementations of a method of assisting and online shopper may include: receiving a referred request for online shopper assistance from a website controlled by a retailer where the referred request includes at least an identity of the website controlled by the retailer. The method may include transmitting a registration request to a computing device associated with the online shopper using a web server where the registration requests includes at least a name of the online shopper and a contact identifier of the online shopper. The method may include receiving the name of the online shopper and the contact identifier from the registration request from the computing device associated with the online shopper at the webserver, and, in response to receiving the name of the online shopper and the contact identifier, establishing a video connection, an audio connection, or both a video connection and an audio connection with the webserver and the computing device associated with the online shopper. The method may include sending a video connection request, an audio connection request, or both a video connection request and an audio connection request to a portable computing device associated with a sales representative associated with the retailer using at least the identity of the website controlled by the retailer to identify the sales representative for sending. In response to receiving a video connection confirmation, an audio connection confirmation, or both a video connection confirmation and an audio connection confirmation from the portable computing device associated with the sales representative, the method may include establishing a video connection, an audio connection, or both a video connection and an audio connection between the webserver, the portable computing device associated with the sales representative and the computing device associated with the online shopper. The method may include generating a sales communication interface using the portable computing device associated with the sales representative, the sales communication interface including at least an item code scanning portion and an add item portion. During the video connection, audio connection or both video connection and audio connection receiving an item scan request from the item code scanning portion, the method may include receiving a scanned item code from the portable computing device associated with the sales representative at the web server, and forwarding the scanned item code to a database server coupled with the web server. The method may also include retrieving a retailer item identity associated with the scanned item code using the database server, forwarding the retailer item identity to the web server, and forwarding the retailer item identity to the portable computing device associated with the sales representative using the web server. The method may include receiving a request to add an item associated with the retailer item identity to a shopper cart associated with the online shopper in response to the sales representative activating the add item portion of the sales communication interface where the shopping cart is included in the website controlled by the retailer. The method may include adding the item associated with the retailer item identity to the shopping cart using the web server without intervention by the online shopper and terminating the video connection, the audio connection, or both the video connection and audio connection between the online shopper and the sales representative in response to a timer signal, a disconnect request from the online shopper, or a disconnect request from the sales representative.

Implementations of a method of assisting an online shopper may include one, all, or any of the following:

The scanned item code may be one of a Universal Product Code (UPC), a Code 3 of 9 barcode, and a Quick Response (QR) code.

Receiving a scanned item code from the portable computing device may further include receiving the scanned item code from a rear facing camera of the portable computing device in response to the sales representative switching from a front facing camera.

The method may further include receiving a plurality of retailer item identity to item code pairs from the retailer and storing the plurality of retailer item identities to item code pairs in the database server.

The method may further include redirecting the online shopper to the shopping cart included in the website controlled by the retailer using the web server after terminating the video connection, the audio connection, or both the video connection and the audio connection.

The method may further include receiving a shopping cart closure indication from the website associated with the retailer and storing the retailer item identity, at least an identity of the sales representative, and the shopping cart closure indication in the database server.

The method may also include transmitting a survey request to the computing device associated with the online shopper using the web server, receiving at least one survey result from the computing device, transmitting the at least one survey result to the database server using the web server, and storing the at least one survey result in the database server.

Adding the item associated with the retailer item identity to the shopping cart may further include adding using a shim supplied to the website controlled by the retailer by the web server where the shim includes an add-to-cart component and a navigate-to-cart component.

Adding the item associated with the retailer item identity to the shopping cart may further include adding using one server sent events and HTTP long polling between the portable computing device associated with the sales representative, the web server, and the website controlled by the retailer.

Implementations of a method of adding an item to an online shopping cart may include providing a sales communication interface on a portable computing device associated with a sales representative, the sales communication interface including at least an item code scanning portion and an add item portion. The method may include during a video connection, an audio connection, or both a video connection and audio connection carried on using the sales communication interface, receiving an item scan request from the item code scanning portion. The method may also include receiving a scanned item code from the portable computing device associated with the sales representative at a web server, forwarding the scanned item code to a database server coupled with the web server, and retrieving a retailer item identity associated with the scanned item code using the database server. The method may include forwarding the retailer item identity to the web server, forwarding the retailer item identity to the portable computing device associated with the sales representative and to a computing device associated with an online shopper communicating with the sales representative using the video connection, audio connection, or both the video connection and the audio connection using the webserver. The method may also include receiving a request to add an item associated with the retailer item identity to a shopping cart associated with the online shopper in response to the sales representative activating the add item portion of the sales communication interface where the shopping cart is associated with a website controlled by a retailer that owns the item. The method may include adding the item associated with the retailer item identity to the shopping cart using the web server without intervention by the online shopper.

Implementations of a method of adding an item to an online shopping cart may include one, all, or any of the following:

The method may further include terminating the video connection, the audio connection, or both the video connection and the audio connection between the online shopper and the sales response in response to a timer signal, a disconnect request from the online shopper, or a disconnect request from the sales representative.

The scanned item code may be a UPC barcode, a Code 3 of 9 barcode or a QR code.

Receiving a scanned item code from the portable computing device may further include receiving the scanned item code from a rear facing camera of the portable computing device in response to the sales representative switching from a front facing camera.

The method may further include receiving a plurality of retailer item identity to item code pairs from the retailer and storing the plurality of retailer item identity to item code pairs in the database server.

The method may further include redirecting the online shopper to the shopping cart associated with the website controlled by the retailer using the web server.

The method may further include receiving a shopping cart closure indication from the website controlled by the retailer and storing the retailer item identity, at least an identity of the sales representative, and the shopping cart closure indication in the database server.

Adding the item associated with the retailer item identity to the shopping cart may further include adding using a shim supplied to the website controlled by the retailer by the web server, the shim including an add-to-cart component and a navigate-to-cart component.

Adding the item associated with the retailer item identity to the shopping cart may further include adding using a shim including an add-to-cart component and a navigate-to-cart component included in the website controlled by the retailer.

Adding the item associated with the retailer item identity to the shopping cart may further include adding using server sent events or HTTP long polling between the portable computing device associated with the sales representative, the web server, and the website controlled by the retailer.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1:
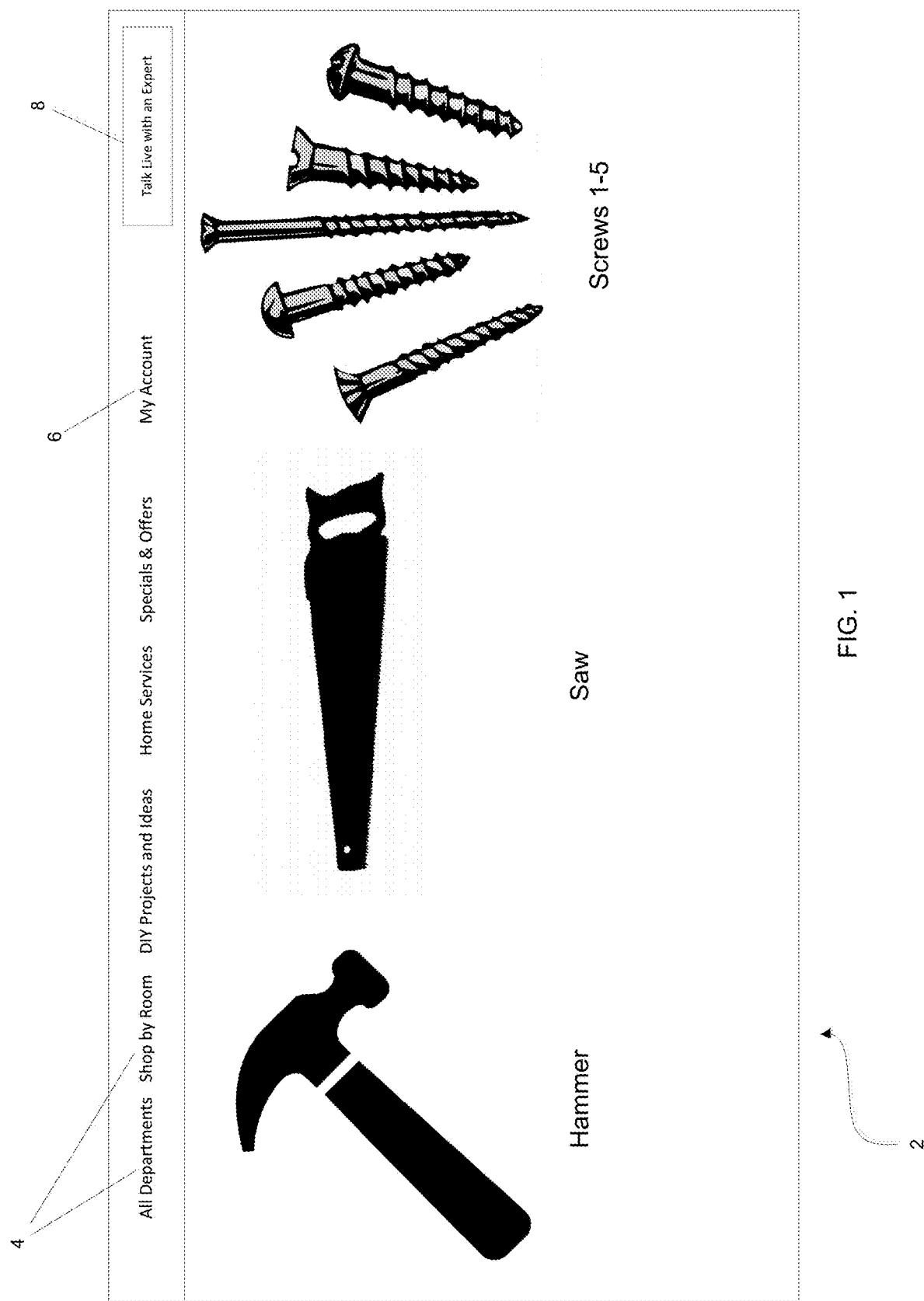
FIG. 1 is a diagram of an implementation of a web page of a website controlled by a retailer.
Figure 2:
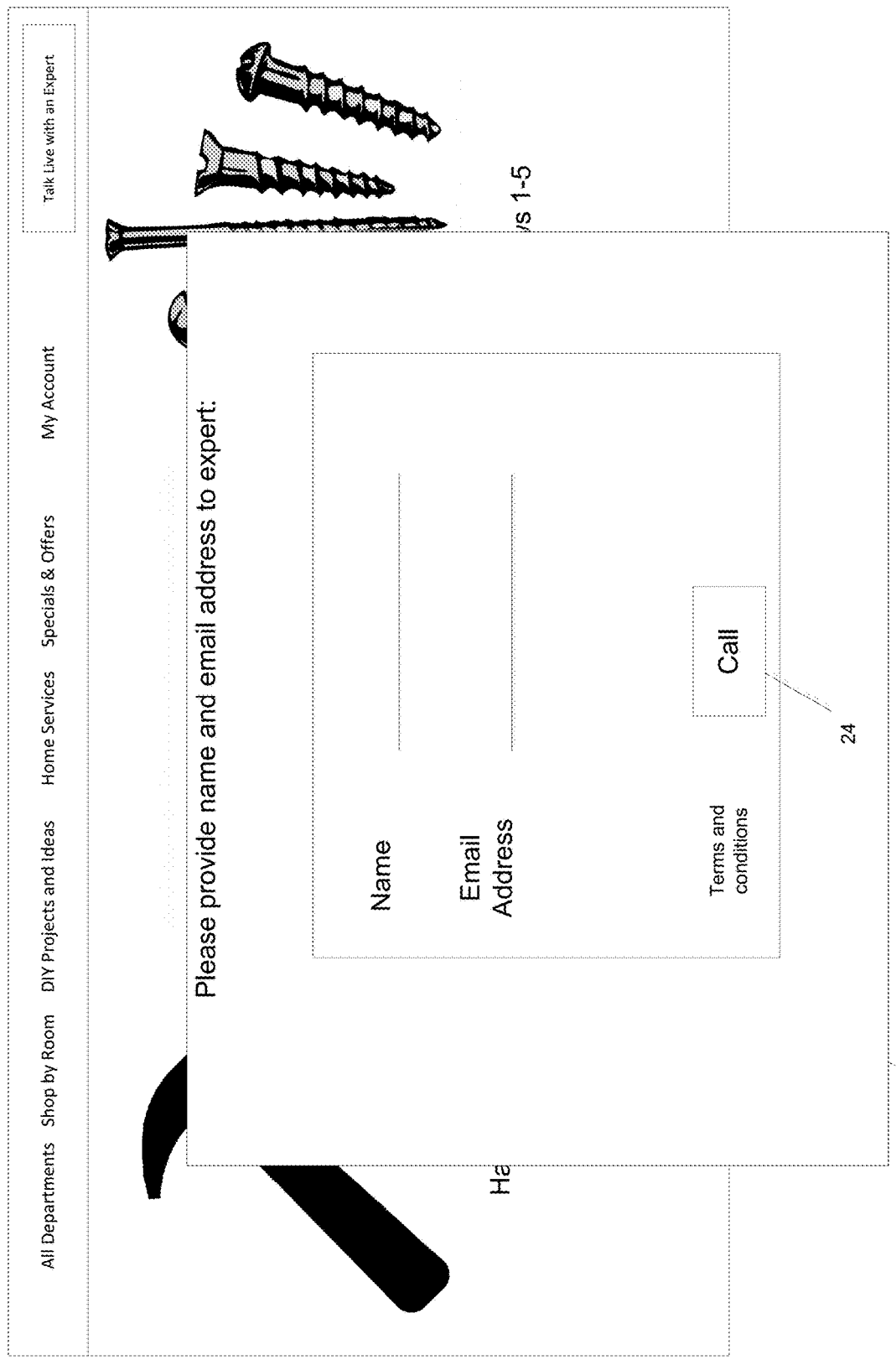
FIG. 2 is a diagram of an implementation of a registration interface showing a name and a contact identifier for an online shopper.

This disclosure, its aspects and implementations, are not limited to the specific components, assembly procedures or method elements disclosed herein. Many additional components, assembly procedures and/or method elements known in the art consistent with the intended online sales system and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such online sales systems and related methods, and implementing components and methods, consistent with the intended operation and methods.

In an online sales environment, such as a website, goods and/or services are displayed on the website for review by online shoppers. In various website designs, initial information is displayed for an item in an initial list of items, often at one degree of magnification of an image of an item. The online shopper desiring more information on the item can then select the item by clicking on an image or other identifier/description/title for the item and an additional view with additional information about the item is displayed by the website in response. Various images of the item may be displayed on the website, along with pricing information, and an icon/button/link that allows the online shopper, through clicking thereon or selecting, to add the item to a shopping cart associated with the online shopper. The shopping cart is a component of the website controlled by the retailer, and is used by the online shopper ultimately to finish checking out and purchasing the items in the shopping cart from the retailer.

One of the challenges and issues that online shoppers face when using retailer websites is that the information about an item may be incomplete or insufficient for their needs. There may not be sufficient photos of the item for the online shopper to figure out whether the item includes a key feature or label information such as ingredient lists may not be included in the available photos or in the content associated with the additional information screens, etc. Unlike shopping at a brick and mortar store, since an online shopper cannot physically inspect the item prior to purchase, the shopper has to rely exclusively on the information provided in the various views of the item provided on a retailer's website. Furthermore, the online shopper, when using the website, has no ability to ask a knowledgeable person from the retailer in an actual conversation whether a specific item they are viewing on the website is the one that would solve their particular problem or issue. For example, the online shopper might be trying to build a deck, and trying to determine which screw type should be used for their particular application—galvanized, coated, or bare screws. Retailer websites selling screws typically indicate accurately that the screws are galvanized, coated, or bare, but this information, while accurate, does not provide the online shopper's needed information on the proper use of each screw to help them know which particular screw would be best used in a deck building application or not.

In addition to the challenges faced by online shoppers using retailer websites relating to incomplete information and the inability to consult with experts or other knowledgeable persons at the retailer, it is also very difficult on many retailer websites for an online shopper to be able to determine whether an item being viewed online is the same as a particular physical item sold in a retailer's brick and mortar store. Some retailer websites may include identifiers like International Standard Book Numbers (ISBN), but these are not applicable to items that are not books or periodicals. Furthermore, unless the specific barcode identities that a retailer uses in their brick and mortar store are displayed in the information associated with the online item being viewed on the website, it is impossible for the online shopper to positively confirm the online item is exactly the same one as the one available in the brick and mortar store. Because of this, even if online shoppers were able to discuss what item to purchase with a sales representative at the retailer, it is generally not possible for the sales representative or the online shopper to positively identify that exact item being displayed online actually corresponds with one that the sales representative is examining in the brick and mortar store. This problem is compounded for items, like screws and others small articles that are sold in a wide variety of optional types (screw length, head type, coating type, threading, material, etc.) by the same retailer under multiple brand names.

These identified issues contribute to the observed higher return rates from online purchases of goods to retailers versus return rates from brick and mortar sales, approximately 30% to approximately 8%. These return numbers indicate that the buying experience online is not equivalent to the buying experience at a brick and mortar store even for the same retailer for reasons involving the current state of the computing systems used to facilitate online sales at retailer websites. These numbers also indicate that it is at least these identified technological issues with retailer website computing systems themselves that create and drive the observed difference in return rates.

This document describes various system and method implementations that may resolve these technological problems and thereby improve the function of those computing systems that operate retailer websites, thus reducing the return rates for goods purchased by online shoppers and improving the sales experience beyond what the current computing systems provide.

Referring to FIG. 1, an implementation of an interface of a website controlled by a retailer 2 is illustrated. The interface shows various initial views of three items available for sale on the website as icons/photos of the items (a hammer, saw, and screws 1-5 are illustrated in interface 2 in FIG. 1). As illustrated, the website interface includes various organizational categories 4 permitting the online shopper to access the various items using the categories chosen and an account section 6 that permits the online shopper to access information about their account including shopping cart information. As illustrated, this interface 2 includes a button/link/control 8 that is identified as allowing the online shopper, when activating the button/link/control 8, to talk in real time with an expert/sales representative. By non-limiting example, a particular online shopper may have a question about which of screws 1-5 should be used in a particular project, which to purchase, or which of screws 1-5 actually corresponds with a particular screw the online shopper already has, but which needs replacement by a substantially identical screw. The online shopper believes the assistance of a sales representative would be needed to answering any of these questions, and so the online shopper clicks on or otherwise selects the button/link/control 8.

In this document, websites associated with/controlled by retailers are referred to as retailer websites. These websites are made available to online shoppers through various combinations of web servers and/or database servers which host and provide the content received by an online shopper using a computing device to access the website. These servers may be physical computing servers or virtualized servers operated by a single or multiple physical computing servers (cloud-based devices). The database servers may likewise be physical computing server devices or virtualized servers operated by a single or multiple physical computing server devices (cloud-based devices). The single or collective group of web services and/or database servers that physically operate to provide the content responsive to requests by the online shopper's computing device are collectively represented as server 10 in FIG. 7. The computing device used by the online shopper to access the interface 2 previously illustrated is represented as either a more fixed position computing device like desktop/laptop 12 in FIG. 7 or a portable computing device like tablet/smartphone/cell phone/personal digital assistant/smart watch 14. Various computing device 12 implementations may include a video camera 16 operably coupled with the computing device, such as, by non-limiting example, a web camera, a video camera, a built in web camera, an integrated camera, or other video data collection device operably coupled with the computing device 12. Generally, most portable computing devices include a camera component provided as a built in/integral component of the portable computing device. In many implementations of portable computing devices 14, both front facing camera(s) (cameras that are located on a side of the device that is on the same side as the main screen of the device) and rear facing camera(s) (cameras that are located on a side of the device that is on an opposite or opposing side of the device as the main screen of the device) may be included. These cameras may have the ability in various implementations to record still visual images and/or video images during operation of the devices. Also, in various implementations, both computing device 12 and portable computing device 14 may include a microphone and one or more audio speakers either coupled with or built in/integral with the devices which permit recording of audio signals and playback of audio signals, respectively.

Figure 7:
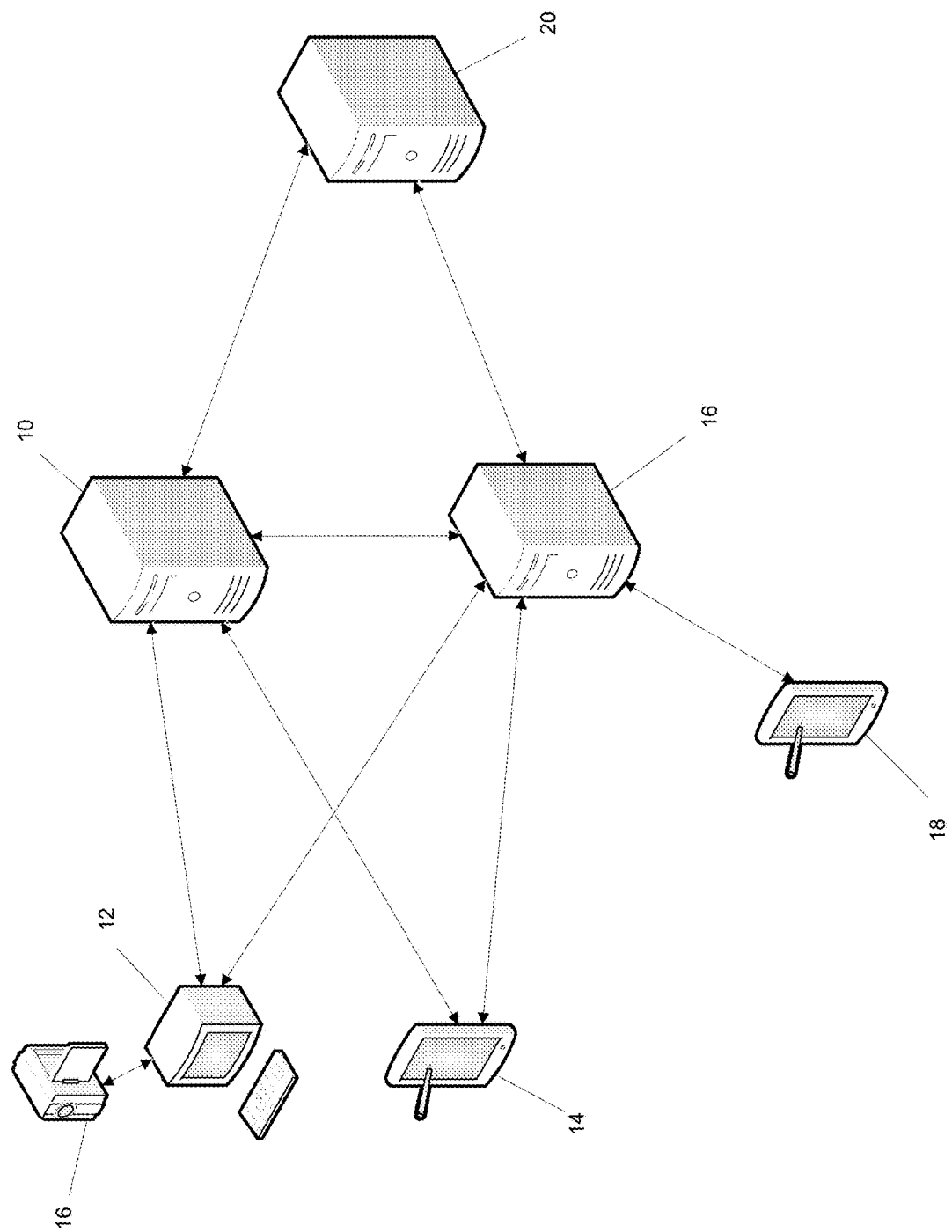
FIG. 7 is a diagram of an implementation of an online sales system.

As illustrated in FIG. 7, the computing device/portable computing device 12, 14 associated with the online shopper is coupled with the server 10 associated with the retailer via telecommunication channels, which may include, by non-limiting example, wired channels, wireless channels, the internet, optical channels, local area networks (LANs), wide area networks (WANs), satellite channels, any combination thereof, and any other telecommunication channel type. The various other system devices disclosed in this document may also be coupled with each other through any of the telecommunication channel types disclosed in this document.

Referring to FIG. 1, when the online shopper clicks/selects the button/control/link 8, the web browser of the computing device 12 used by the online shopper is referred to a web server 16 associated with the system implementations disclosed herein via a referral/referrer request. In various implementations the referral request/referred request includes at least the identity of the website controlled by the retailer providing the referral request [by non-limiting example, domain name, website link, Internet Protocol (IP) address, predetermined secured code, and any other identifier of the retailer's website]. The system webserver 16 uses the identity of the referring retailer website to determine various operational details to be used in subsequent method steps including, by non-limiting example, validating the retailer has access to the system, determining a list of sales representatives associated with the retailer, identifying a database of items to use associated with the retailer, and any other retailer-related parameters of the system. In response to receiving the referred request from the server 10 associated with the retailer, the webserver 16 transmits a registration request to the computing device 12, 14 associated with the online shopper. Referring to FIG. 1, a web browser or other application included on the computing device 12, 14 processes the registration request and generates a registration interface 22 on a screen of the computing device 12, 14. As illustrated, the registration interface 22 permits the online shopper to enter their name and a contact identifier for the online shopper which may be, by non-limiting example, an email address, a phone number, a username, or any other identifier capable of being used by the system and/or retailer to identify/contact the online shopper. In various implementations, the contact identifier may not be used, and only the name of the online shopper may be collected. Also as illustrated, a link/reference to a set of terms of use/conditions of use for the system may be available for review via the registration interface 22.

As illustrated, the registration interface 22 includes a button/link/form 24 which the online shopper can click/select to initiate a call with a sales representative associated with the retailer. Upon selection of the button/link/form 24, the web server 16 receives the name and contact identifier of the online shopper and then establishes a video, audio, or both video and audio connection between the computing device 12, 14 and the web server 16. Various system implementations may employ audio only communication, video only communication, or both audio and video communication between the online shopper and the sales representative. Because of the ability for the sales representative to directly add items to an online shopping cart associated with the online shopper using the system (which will be described in greater detail hereafter), the need for full video communication may not be necessary in various implementations. This may permit the sales representative to assist under various conditions where video communication is not possible such as, by non-limiting example, limited network bandwidth, low computing device functionality, camera incompatibility, poor connectivity, and other factors impacting the ability of the system to establish a full video and audio connection.

In various implementations, the audio and/or video connection may be established using JavaScript in combination with the software marketed under the tradename SIGNALR by Microsoft Corporation of Redmond, Wash. This may permit a bi-directional communication link to be established between the computing device 12, 14 and the webserver to facilitate the communication link between the devices over the telecommunication channel.

Figure 3:
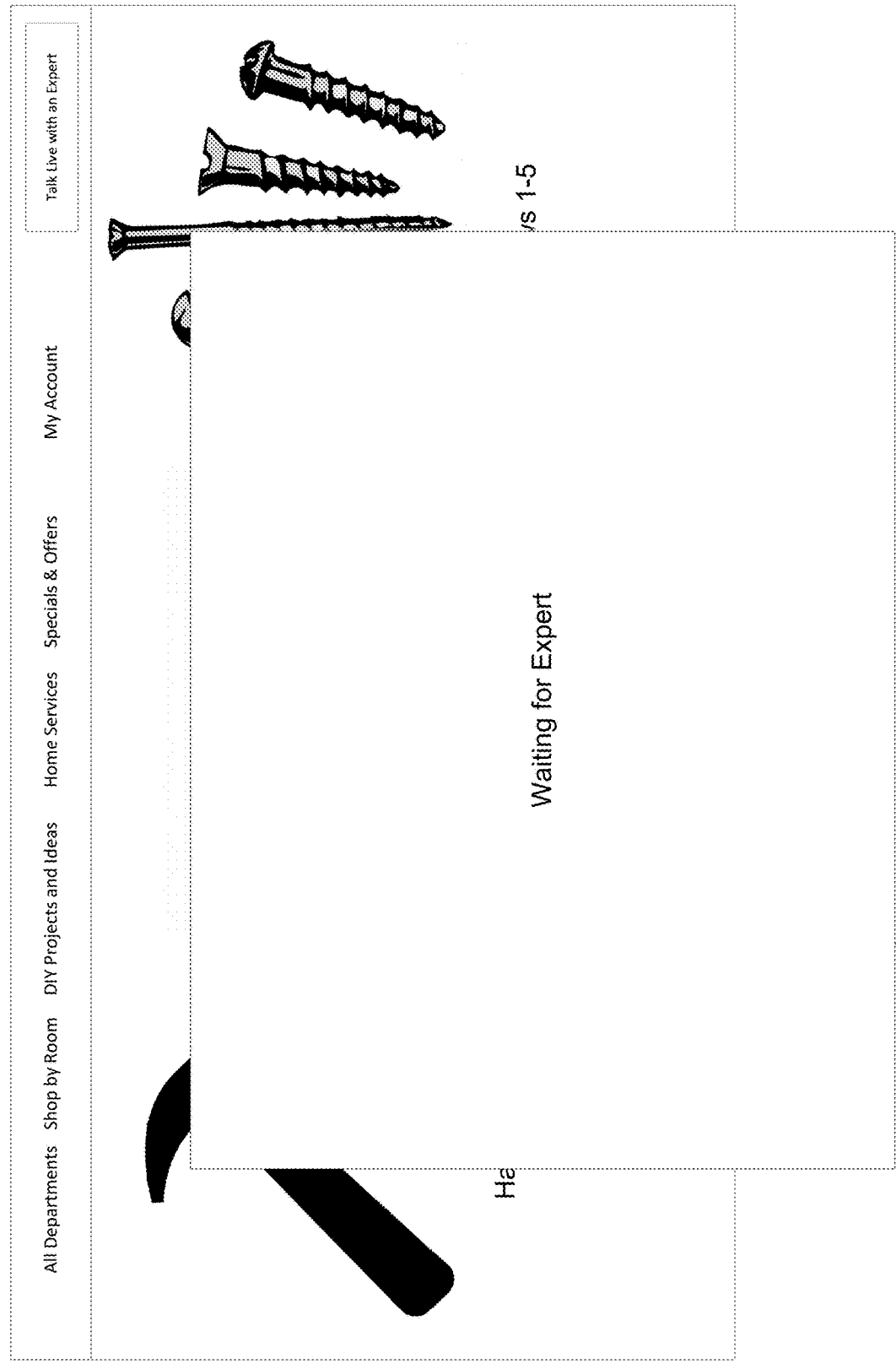
FIG. 3 is a diagram of a call interface displayed to an online shopper while a sales representative is selected to take the call.

Referring to FIG. 3, after the audio and/or video connection has been established, a connection confirmation is sent by the web server 16 to the computing device 12, 14 which is used by the web browser or application of the computing device 12, 14 to generate a waiting interface 26 (an implementation of which is illustrated in FIG. 3). The waiting interface 26 communicates to the online shopper that the system is working to identify an expert/sales representative who will participate in the call with the online shopper.

Figure 4:
FIG. 4 is a diagram of a call request interface displayed to a sales representative on a portable computing device associated with the sales representative.

While the waiting interface 26 is displayed on the computing device 12, 14 of the online shopper, the system identifies one or more sales representatives with portable computing devices 18 currently connected via a telecommunication channel with the web server 16 (see FIG. 7). The system then transmits a video connection request, audio connection request, or a video and audio connection request to the portable computing device 18 associated with the sales representative. Where multiple sales representatives are connected with the web server 16, the video, audio or both video and audio request may be broadcast simultaneously to all sales representatives or may be broadcast to one sales representative at a time (round robin). Also, in some system implementations, the online shopper may be able to request a call with a specific sales representative using, by non-limiting example, a previous ticket number, a previous call number, a name of the sales representative, or any other identifier used to enable an online shopper to connect using the system with a specific sales representative. The portable computing device 18 (which may be any disclosed in this document) then generates a sales call pending interface 28 (see FIG. 4) using a web browser or application included in the device 18. The sales call pending interface 28 shows the sales representative the list of all incoming online shopper calls waiting to be accepted by a sales representative and, in particular implementations, may show the name of the online shopper as part of the call. A button/link/form 30 is located on the sales call pending interface 28 which the sales representative can use to connect with the online shopper. When the button/link/form 30 is selected, the portable computing device 18 sends a video connection confirmation, audio connection confirmation or a video and audio connection confirmation to the web server 16. In various implementations, this establishes the video, audio, or both video and audio connection between the portable computing device 18 and the web server 16. In particular implementations, the connection is made using SIGNALR, similar to how the connection was made between the computing device 12 and the web server 16.

Figure 5:
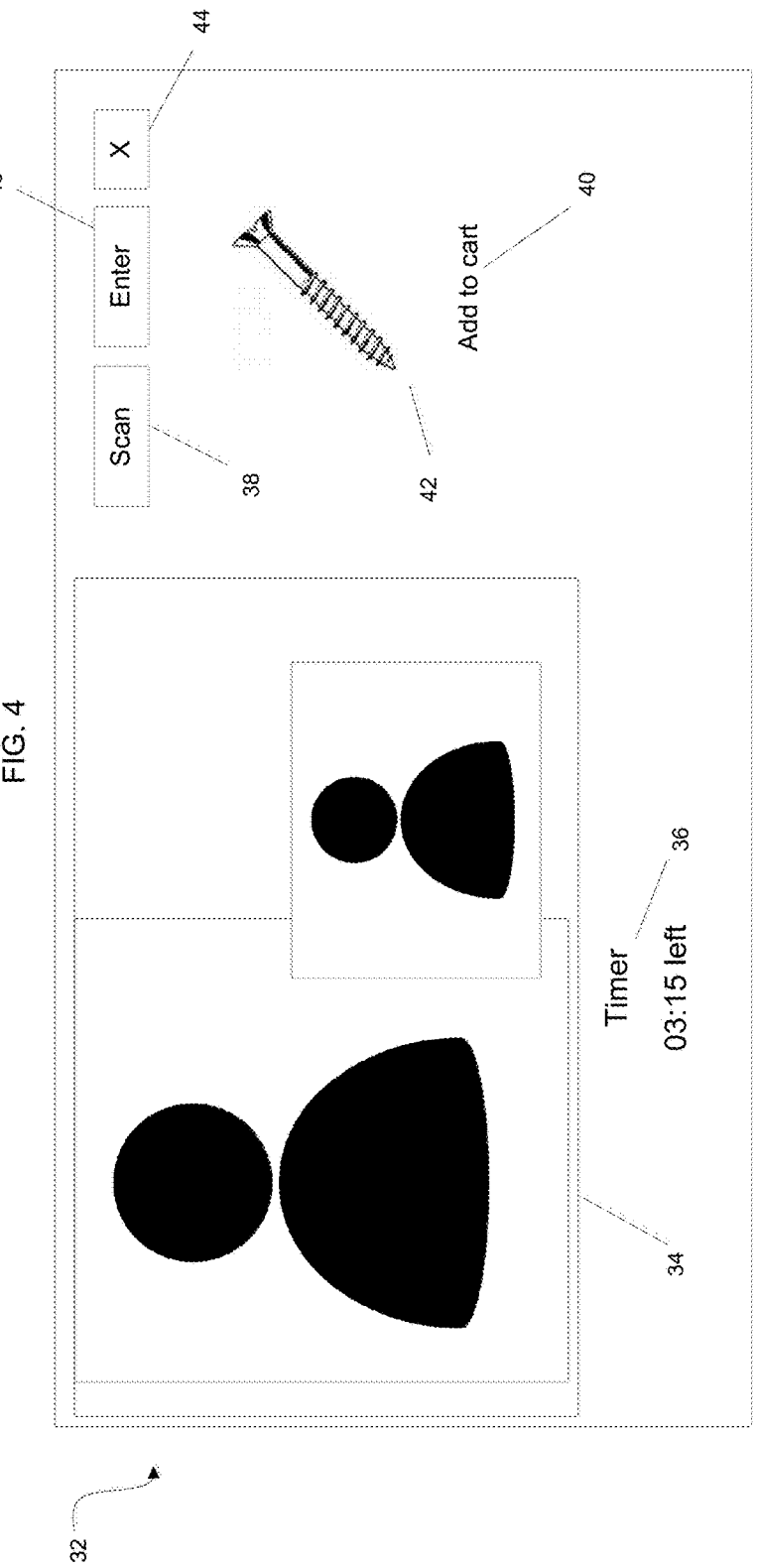
FIG. 5 is a diagram of an implementation of a sales communication interface.

In various implementations, the two connections need to be joined to enable the web server 16 to allow the online shopper to communicate with the sale representative. In various implementations, the video, audio, or video and audio stream is established through advertising Interactive Connectivity Establishment (ICEConnection) connection endpoints to the webserver functioning as a SIGNALR hub, followed by executing additional logic using Session Description Protocol (SDP) signaling to link the two connections together using SIGNALR procedures. Either during this process or after this process, the portable computing device 18 generates a sales communication interface to facilitate communication with the online shopper. An implementation of a sales communication interface 32 is illustrated in FIG. 5. As illustrated, the interface 32 may include an audio/video portion 34 and a timer portion 36. The audio/video portion 34 may take on various forms, depending on whether audio only is being handled (where the interface may simply include the names of the online shopper and the sales representative in the conversation) or show both the video of the online shopper and the sales representative in a picture-in-picture mode as illustrated in FIG. 5. A wide variety of interface designs are possible using the principles disclosed in this document. The interface 32 also includes an item code scanning portion 38 and an add item portion 40. In various implementations, an item portion 42 of the interface may be used to display desired information about an item under discussion, such as, by non-limiting example, an image of the item, one or more specifications of the item, one or more uses of the item, and any other aspect of the item relevant to the sales conversation regarding the item.

During the audio, video, or audio and video call between the online shopper and the sales representative, the timer portion 36 indicates how much time the call has taken and/or how much time the call has left before it will automatically terminate. In various implementations, the call times may be regulated by the system using the timer (with automatic disconnection at timer expiration), to encourage online shoppers and sales representatives to discuss the most pertinent matters quickly about an item. In other system implementations, the call times may merely be logged by the timer portion, allowing the calls to continue as long as the online shopper and sales representative decide to engage in them.

While the call continues as facilitated by the web server 16 of the system, the online shopper and sales representative discuss the item in question. By non-limiting example, the online shopper may show the sales representative the type of screw that needs to be replaced and may provide some details about the screw (it is Phillips head, 1.5 inches long, used to fasten drywall to studs, etc.). Because the sales representative can also see the item (in the case of a video call), the sales representative can see the color of the screw and get an idea of the threading of the screw by inspection without the online shopper being able to know/communicate that information during the call. Using that information, the sales representative can move through the brick and mortar store where the sales representative is located and find the type of screw being referenced on the shelf. The sales representative can then click/select the item code scanning portion 38 of the sales communication interface 32 or manually enter a code using the code entering portion of the interface 32 by selecting enter button/control/link 46. Where the item code scanning portion 38 is selected, the portable computing device 18 receives an item scan request. The portable computing device 18 processes the item scan request to change the camera currently being used from the front facing camera to the rear facing camera, also showing the item to the online shopper. Either simultaneous with the camera change or after the camera change, the portable computing device 18 then engages a scanner component to attempt a read of an item code associated with the item at the brick and mortar store. The item code may be, by non-limiting example, a Universal Product Code barcode, a Code 3 of 9 barcode, a Quick Response code, a retailer-specific code, or any other code type capable of identifying the item in question to the system. If the scanner component reports it has successfully read the item code, the item code is then forwarded by the portable computing device 18 to database server 20 (see FIG. 7) associated with the system. While the camera switching can happen automatically upon selection of the code scanning portion 38, in various implementations either the front or rear facing camera could also be manually selected by the user using the portable computing device at any time during the call.

In various implementations, during initial set up of a retailer with the system, the database server 20 receives and stores a plurality of retailer item identity to item code pairs from a retailer item database associated with the server 10 of the retailer. The retailer item identity is the identifier used on the retailer's website to refer to a particular item; the item code is the actual code found on the packaging of the same physical item in a brick and mortar location of the retailer's store. Because the website of the retailer typically uses retailer item identities rather than item codes to handle and manage the items displayed as being for sale on the retailer's website, this organizational arrangement means that there is no way for an online shopper to positively confirm that an item displayed on the retailer's website is the same exact physical item for sale in the retailer's brick and mortar store. Because of this, the system's database server 20 is used to store the exact correlation between the retailer item identities of the items on the website with the specific item codes associated with the physical items themselves. This allows the system to ensure that, when an item code is read by the scanning portion 38, the item code can be used to identify the exact same specific item from the list of items currently available for sale on the retailer's website. Using a database server 20 associated with the system to store the retailer item identity to item code pairs eliminates the need for the retailer to maintain such a specific database in its own systems for use by the system and may allow the system to more quickly access the needed information at the time of the item code scan.

Following forwarding the scanned item code to the database server 20, the database server 20 retrieves the corresponding retailer item identity associated with that scanned item code from the database and forwards the retailer item identity to the web server 16. The web server 16 then forwards the retailer item identity to the portable computing device 18 associated with the sales representative. The portable computing device 18 then can use the retailer item identity and the website associated with the retailer to retrieve information relating to the item (photo, specifications, etc.) and populate the item portion 42 in some implementations. In other implementations, however, the item portion 42 may not be used and the retailer item identity is used by the portable computing device 18 to generate an add item request. In various implementations, the information with respect to the item is also provided to the online shopper's interface on the computing device 12, 14 associated with the shopper.

After confirming during the call with the online shopper that the item that was code scanned is the item the online shopper wishes to purchase, the sales representative then clicks/selects the add item portion 40 of the sales communication interface 32. In response to the selection, the portable computing device 18 then generates an add item request and sends the request to the web server 16 which sends the request to a shopping cart associated with the online shopper where the shopping cart is associated with the website controlled by the retailer. In various implementations, this may be done, by non-limiting example, by the web server 16 sending the add item request to the computing device 12, 14 associated with the online shopper. The computing device 12, 14, using the web browser or application thereon, then adds the item that corresponds with the retailer item identity to the shopping cart. In particular implementations this is done by the web browser or application associated with the system executing a shim associated with the system that causes the website associated with the retailer to emit an EMAPP-SHIM cookie that includes a shopping cart identifier, a set of instructions on how to add an item to the shopping cart, and a set of instructions on how to navigate to the shopping cart [Application Programming Interface (API) calls associated with the retailer website]. In various implementations, the shim includes an add-to-cart function for used by the web browser or application of the computing device 12, 14 if the function is not currently available.

In particular implementations, the system may generate an inter-window messaging listener to listen for the API calls previously mentioned to come from an iframe (inline frame) that is activated when the add item request is received by the computing device 12, 14 associated with the online shopper. When the add item request is received, the shim (which may be coded in JavaScript or other script language), then executes to add the item identified in the add item request to the shopping cart automatically without any intervention or involvement by the online shopper.

In various implementations where the shim is installed into the web server 16 of the system, some additional security setup between the system and the retailer's server 10 must be implemented. In various implementations, this may include the retailer created a Domain Name Service (DNS) A record that points to the domain name(s) associated with the system's webserver 16 and database server 20 and ensure that the document. domain of the Document Object Model (DOM) of all pages loaded in the retailer's website are set to the retailer's domain suffix. Also the retailer must purchase/issue a Secure Socket Layer (SSL) certificate for the domain associated with the system for installation on the web server 16 and database server 20 of the system. With these procedures in place, inherent interwindow trust has been created on the basis of the document.domain and the SSL certificates between the retailer's server 10 and the web server 16 and the database server 20, permitting the shim to operate and the add to cart function to operate in a trusted communication environment.

In other implementations however, the system, rather than the retailer's website may provide the signaling to activate the remote procedure calls (API calls) to pass the add to cart functions needed to add the item to the shopping cart without intervention by the online shopper. In this implementation, the shim would be installed on the server 10 associated with the retailer's website and the server 10 then creates a websocket connection to the web server 16 and the database server 20 of the system which listens for the API calls during the online shopper's browser session. When the sales representative selects the add item portion, the add item request is not sent to the audio/video connection but is routed to the connection/session between the online shopper and the server 10, which then causes the shim to execute the functions needed to add the specific item associated with the scanned item code to the online shopper's shopping cart automatically. In such implementations, the three sessions (shopper audio/video, shopper browser, and sales representative audio/video) are kept synchronized by a session Globally Unique Identifier (GUID) or Universally Unique Identifier (UUID) generated at the beginning of the process when the online shopper selects the call button/link/form 24 on the registration interface 22. In this way, the iframe needed to listen/perform the various add to cart functions can be loaded using the web browser/application controlled by the system without having to have the retailer make a custom DNS entry for the system or have a specific SSL certificate for use with the web server 16 and database 20 of the system.

In yet other implementation, however, other forms of evented persistence could be utilized to listen for and activate the add-to-cart functionality in the online shopper's web browser session with the retailer's website. The may include using Server Sent Events to listen for add to cart messaging from the server, and then activating the add-to-cart functionality of the website for an item include in the messaging. HTTP Long Polling may also be used to allow the web browser/application associated with the online shopper to periodically poll the server to determine if an add to cart message is ready for retrieval, retrieving the add-to-cart message, and then activating the add-to-cart functionality to add the item(s) referred to in the message. The use of SIGNALR may allow multiple forms of evented persistence (including any disclosed in this document) to be used in parallel, permitting the system to work in multiple set up configurations with various retailers as the SIGNALR may drop through various levels of messaging compatibility to find the specific one the retailer is setup with the system to use during a call. A wide variety of possibilities could be used in various system implementations using the principles disclosed in this document.

After the item has been added to the shopping cart without requiring intervention by the online shopper through interaction between the system and the server 10 of the retailer's website, the video, audio, or both audio and video connection between the online shopper and the sales representative is terminated. This may take place through the system terminating the connection through receiving a timer signal from the timer portion of the sales communication interface, or through either the sales representative or the online shopper sending a disconnect request to the system. For the sales representative, the disconnect request may be sent using the disconnect box 44 illustrated in FIG. 5.

An example of a sales communication interface 32 is illustrated in FIG. 5 which shows those portions for use by a sales representative. A corresponding shopper communication interface may be included in various implementations which may include an audio/video portion, a timer portion, a disconnect button and an item information portion, which may correspond in structure and arrangement to those similar portions illustrated in FIG. 5. A wide variety of shopper communication interfaces can be constructed using the principles disclosed in this document.

Figure 6:
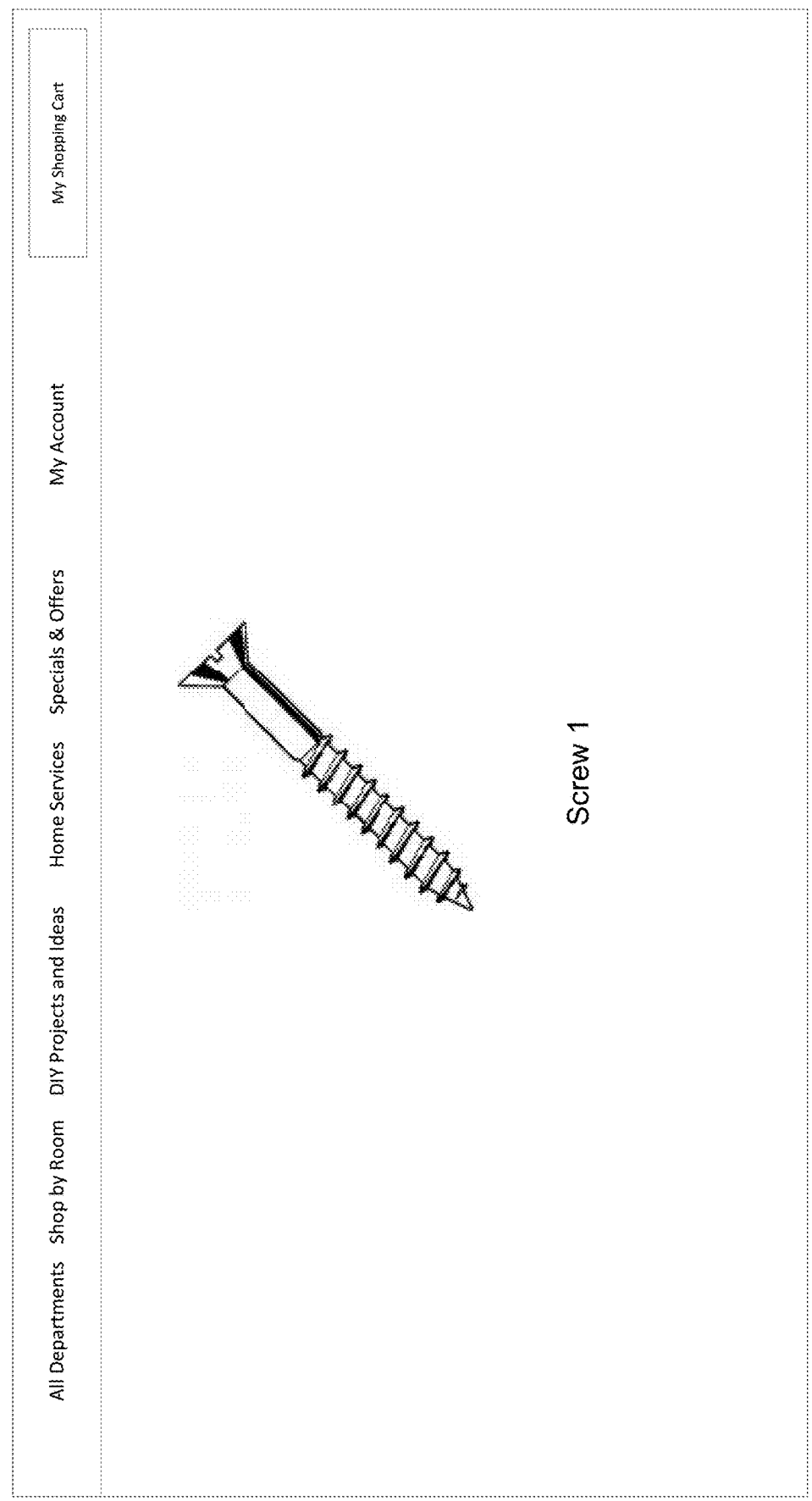
FIG. 6 is an implementation of a shopping cart interface associated with the website controlled by the retailer.

Upon termination of the call, the system may then redirect the online shopper to the shopping cart page associated with the shopping cart in the retailer's website which now contains the added item. FIG. 6 illustrates a shopping cart interface 48 that shows that during the conversation, the sale representative identified that it was screw 1 that was the proper replacement screw for the screw that the online shopper had shown and described during the call. Since the sales representative was able to locate that screw in the brick and mortar store, scan the code associated with that particular screw, and the system was then able to use that code to automatically add the corresponding online item that exactly corresponded with the item in the store, the online shopper can with confidence purchase the item, knowing it was the one shown and discussed during the call. As a result, the odds that the online shopper will 1) close out the cart by purchasing the item(s) in the cart and 2) not return any of the items purchased in the cart is greatly enhanced. These benefits result because the system acts to improve the existing retailer's computing system's function by enabling the automatic adding of the online equivalents of those items identified in the store as being the specific ones the online shopper needs. In this way, the sales experience for the online shopper is made more congruent with that experienced by an in-store shopper who is able to receive the specific item in an in-person conversation with a sales representative. As a result, sales conversions increase and returns decrease may be expected for retailers selling online using a website while using the system and method implementations disclosed in this document.

Additional data collection system components and methods may be employed in various system and method implementations. By non-limiting example, the web server 16 may receive a shopping cart closure indication from the website associated with the retailer indicating that the shopping cart has closed because the online shopper purchased the item(s) automatically added to the shopping cart. The web server 16 may then direct the database server 20 to store in the database the identity of the retailer, the shopping cart closure indication, and an identity of the sales representative in the database. Additional information regarding the sale may also be stored, such as, by non-limiting example, the item(s) purchases, the duration of the call, the name of the online shopper, a contact identifier for the online shopper, or any other data parameter related to the call and/or shopping cart. In other implementations, the system may, after closing the video, audio, or audio and video call, transmit a survey request to the computing device 12, 14 associated with the online shopping using the web server 16. The web server 16 may then receive at least one survey result from the computing device indicating the online shopper provided an answer to one question on the survey, and then transmit the at least one survey result to the database server 20 for storage in the database of the database server. In this way, feedback on the sales representative's performance and/or the function of the system can be obtained. In various system and method implementations, various administrative/managerial reporting methods may be employed which may allow administrators of the system to obtain various reports from the stored data in the database. This may allow the administrators to identify good/poor performing sales representatives, issues with the system functions, and evaluate utilization rates of the system.

In various system and method implementations, the system and methods may be implemented using a stack of various components working together to create a Real Time Connection Peer Connection-based web browser application that facilitates communication in combination with an add-to-cart capability implemented using web-socket remote procedure calls. The particular stack of components that may be employed in various implementations includes website code marketed under the tradename ASP.NET MVC by Microsoft corporation in combination with a web interface developed using code marketed under the tradename OWIN by the OWIN Working Group to form n-tier and middleware-based web architecture for the system. The database server may employ Structure Query Language (SQL) Server either in a cloud-based mode (those marketed under the tradename AMAZON WEB SERVICES, AWS by Amazon.com, Inc. of Seattle, Wash.) or standalone server mode. SIGNALR may be used for the evented communication in combination with signaling provided by the software marketed under the tradename WEBRTC by Google, Inc. of Menlo Park, Calif. The software marketed under the tradename KNOCKOUT.JS by knockoutjs.com may be used for viewmodel rendering and dependency-chain tracking of the system. The user interfaces for the web browser/applications (presentation layer) may be developed and implemented using the software marketed under the tradename ONSENUI by the Monaca x Onsen UI Team. A wide variety of other components may be employed as well in various implementations to enable and form the different layers, functions, and structures of the system and method implementations.

In places where the description above refers to particular implementations of online sales system and related methods and implementing components, sub-components, methods and sub-methods, it should be readily apparent that a number of modifications may be made without departing from the spirit thereof and that these implementations, implementing components, sub-components, methods and sub-methods may be applied to other online sales system and related methods.

What is claimed is:

1. A method of adding an item to an online shopping cart, the method comprising:
  providing a sales communication interface on a portable computing device associated with a sales representative, the sales communication interface including at least an item code scanning portion and an add item portion;
  during one of a video connection, an audio connection, and both a video connection and an audio connection between the sales representative and an online only shopper carried on using the sales communication interface and a web server, receiving an item scan request from the item code scanning portion;
  receiving a scanned item code from the portable computing device associated with the sales representative at the web server;
  forwarding the scanned item code to a database server coupled with the web server;
  retrieving a retailer item identity associated with the scanned item code using the database server;
  forwarding the retailer item identity to the web server;
  forwarding the retailer item identity to the portable computing device associated with the sales representative and to a computing device associated with the online only shopper communicating with the sales representative using the one of the video connection, audio connection, and both the video connection and the audio connection using the web server;
  receiving a request to add an item associated with the retailer item identity to an online only shopping cart associated with the online only shopper in response to the sales representative activating the add item portion of the sales communication interface, the online only shopping cart associated with a website controlled by a retailer that owns the item;
  adding the item associated with the retailer item identity to the online only shopping cart using the web server without intervention by the online only shopper.

2. The method of claim 1, further comprising terminating the one of the video connection, the audio connection, and both the video connection and the audio connection between the online only shopper and the sales representative in response to one of a timer signal, a disconnect request from the online only shopper, and a disconnect request from the sales representative.

3. The method of claim 1, wherein the scanned item code is one of a Universal Product Code barcode, a Code 3 of 9 barcode, and a Quick Response code.

4. The method of claim 1, wherein receiving a scanned item code from the portable computing device further comprises receiving the scanned item code from a rear facing camera of the portable computing device in response to the sales representative switching from a front facing camera.

5. The method of claim 1, further comprising receiving a plurality of retailer item identity to item code pairs from the retailer and storing the plurality of retailer item identity to item code pairs in the database server.

6. The method of claim 1, further comprising redirecting the online only shopper to the online only shopping cart associated with the website controlled by the retailer using the web server.

7. The method of claim 1, further comprising:
receiving a shopping cart closure indication from the website controlled by the retailer; and
storing the retailer item identity, at least an identity of the sales representative, and the shopping cart closure indication in the database server.

8. The method of claim 1, wherein adding the item associated with the retailer item identity to the online only shopping cart further comprises adding using a shim supplied to the website controlled by the retailer by the web server, the shim comprising an add-to-cart component and a navigate-to-cart component.

9. The method of claim 1, wherein adding the item associated with the retailer item identity to the online only shopping cart further comprises adding using a shim comprising an add-to-cart component and a navigate-to-cart component comprised in the website controlled by the retailer.

10. The method of claim 1, wherein adding the item associated with the retailer item identity to the online only shopping cart further comprises adding using one of server sent events and HTTP long polling between the portable computing device associated with the sales representative, the web server, and the website controlled by the retailer.

\* \* \* \* \*